US012646309B2

(12) United States Patent
Sivaraj et al.

(10) Patent No.: US 12,646,309 B2
(45) Date of Patent: Jun. 2, 2026

(54) NEURAL NETWORK ARCHITECTURES WITH MULTIPLE NORMALIZATION LAYERS FOR MACHINE VISION

(71) Applicant: Google LLC, Mountain View, CA (US)

(72) Inventors: Manoj Kumar Sivaraj, Amsterdam (NL); Neil Matthew Tinmouth Houlsby, Zürich (CH); Mostafa Dehghani, Amsterdam (NL)

(73) Assignee: GOOGLE LLC, Mountain View, CA (US)

( * ) Notice: Subject to any disclaimer, the term of this patent is extended or adjusted under 35 U.S.C. 154(b) by 320 days.

(21) Appl. No.: 18/419,170

(22) Filed: Jan. 22, 2024

(65) Prior Publication Data

US 2024/0257511 A1      Aug. 1, 2024

Related U.S. Application Data

(60) Provisional application No. 63/481,748, filed on Jan. 26, 2023.

(51) Int. Cl.
*G06V 10/82* (2022.01)
*G06V 10/26* (2022.01)

(52) U.S. Cl.
CPC .............. *G06V 10/82* (2022.01); *G06V 10/26* (2022.01)

(58) Field of Classification Search
CPC ............................... G06V 10/82; G06V 10/26
See application file for complete search history.

(56) References Cited

U.S. PATENT DOCUMENTS

| 2022/0108478 A1* | 4/2022 | Houlsby | ................ G06N 3/045 |
| 2023/0196714 A1* | 6/2023 | Bamba | ................. G06V 10/454 |
| | | | 382/190 |

(Continued)

FOREIGN PATENT DOCUMENTS

WO      WO-2022192747 A1 *   9/2022   ........... G06T 7/0012

OTHER PUBLICATIONS

Shleifer et al., "NormFormer: Improved Transformer Pretraining with Extra Normalization", arXiv:2110.09456v2, Nov. 1, 2021, 14 pages.

(Continued)

*Primary Examiner* — Carol W Chan
(74) *Attorney, Agent, or Firm* — DORITY & MANNING, P.A.

(57) ABSTRACT

One example aspect of the present disclosure is directed to a neural network for machine vision. The neural network may include a stem block that includes a set of stem layers. The neural network may additionally include a visual transformer block. The set of stem layers may include a patch layer, a first normalization layer, an embedding layer, and a second normalization layer. The patch layer subdivides an input image into a set of image patches. The first normalization layer generates a set of normalized image patches by performing a first normalization process on each image patch of the set of image patches. The patch layer feeds forward to the first normalization layer. The embedding layer generates a set of vector embeddings. Each vector embedding of the set of embedding vectors is a projection of a corresponding normalized image patch from the set of normalized image patches onto a visual token. The first normalization layer feeds forward to the embedding layer. The second normalization layer generates a set of normalized vector embeddings by performing a second normaliza- (Continued)

tion process on each vector embedding of the set of vector embeddings. The embedding layer feeds forward to the second normalization layer. The transformer block enables one or more machine vision tasks for the input image based on the set of normalized vectors. The second normalization layer feeds forward to the transformer block.

20 Claims, 5 Drawing Sheets

(56)                    References Cited

U.S. PATENT DOCUMENTS

| | | | |
|---|---|---|---|
| 2023/0245424 A1* | 8/2023 | Back | G06N 7/01 |
| | | | 382/156 |
| 2024/0153258 A1* | 5/2024 | Mangla | G06V 10/764 |

OTHER PUBLICATIONS

Steiner et al., "How to Train your ViT? Data, Augmentation, and Regularization in Vision Transformers", arXiv:2106.10270v2, Jun. 23, 2022, 16 pages.

Xiao et al., "Early Convolutions Help Transformers See Better", arXiv:2106.14881v3, Oct. 25, 2021, 16 pages.

Xiong et al., "On Layer Normalization in the Transformer Architecture", arXiv:2002.04745v2, Jun. 29, 2020, 17 pages.

Xu et al., "Understanding and Improving Layer Normalization", arXiv:1911.07013v1, Nov. 16, 2019, 19 pages.

Zhai et al., "LiT: Zero-Shot Transfer with Locked-image text Tuning", arXiv:2111.07991v3, Jun. 22, 2022, 26 pages.

Zhai et al., "Scaling Vision Transformers", arXiv:2106.04560v2, Jun. 20, 2022, 31 pages.

* cited by examiner

300

NEURAL NETWORK ARCHITECTURES WITH MULTIPLE NORMALIZATION LAYERS FOR MACHINE VISION

PRIORITY CLAIM

The present application claims priority to U.S. Provisional Application No. 63/481,748, entitled "NEURAL NETWORK ARCHITECTURES WITH MULTIPLE NORMALIZATION LAYERS FOR MACHINE VISION," filed on Jan. 26, 2023, the contents of which are herein incorporated in their entirety.

FIELD

The present disclosure relates generally to machine vision. More particularly, the present disclosure relates to neural network architectures with multiple layers for normalizing patches of an input image for machine vision.

BACKGROUND

Machine vision tasks (e.g., image classification) continue to be a goal of many computational scientists and engineers. Some of these machine vision researchers employ visual transformer models. Conventional transformer models may employ normalization layers between self-attention and multilayer perceptron (MLP) blocks of an implementing neural network.

SUMMARY

Aspects and advantages of embodiments of the present disclosure will be set forth in part in the following description, or can be learned from the description, or can be learned through practice of the embodiments.

One example aspect of the present disclosure is directed to a computing system. The system includes one or more processors and one or more non-transitory computer-readable media. The computer media store instructions that when executed by the one or more processors, cause the computer system to implement a neural network. In non-limiting embodiments, the neural network may be a neural network for machine vision. The neural network may include a stem block that includes a set of stem layers. The neural network may additionally include a visual transformer block. The set of stem layers may include a patch layer, a first normalization layer, an embedding layer, and a second normalization layer. The patch layer subdivides an input image into a set of image patches. The first normalization layer generates a set of normalized image patches by performing a first normalization process on each image patch of the set of image patches. The patch layer feeds forward to the first normalization layer. The embedding layer generates a set of vector embeddings. Each vector embedding of the set of embedding vectors is a projection of a corresponding normalized image patch from the set of normalized image patches onto a visual token. The first normalization layer feeds forward to the embedding layer. The second normalization layer generates a set of normalized vector embeddings by performing a second normalization process on each vector embedding of the set of vector embeddings. The embedding layer feeds forward to the second normalization layer. The transformer block enables one or more machine-learned tasks for the input image based on the set of normalized vectors. The second normalization layer feeds forward to the transformer block. In non-limiting embodiments, at least one of the machine-learned tasks may be a machine vision task.

Another example aspect of the present disclosure is directed to a method for machine vision. The method includes receiving, by a computing system, an input image. The computing system may subdivide the input image into a set of image patches. The computing system may generate a set of normalized image patches by performing a first normalization process on each image patch of the set of image patches. The computing system may generate a set of vector embeddings. Each vector embedding of the set of embedding vectors is a projection of a corresponding normalized image patch from the set of normalized image patches onto a visual token. The computing system may generate a set of normalized vector embeddings by performing a second normalization process on each vector embedding of the set of vector embeddings. The computing system may determine a machine-vision result based on the set of normalized vector embeddings and a visual transformer model. The computing system may provide the machine-vision result.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
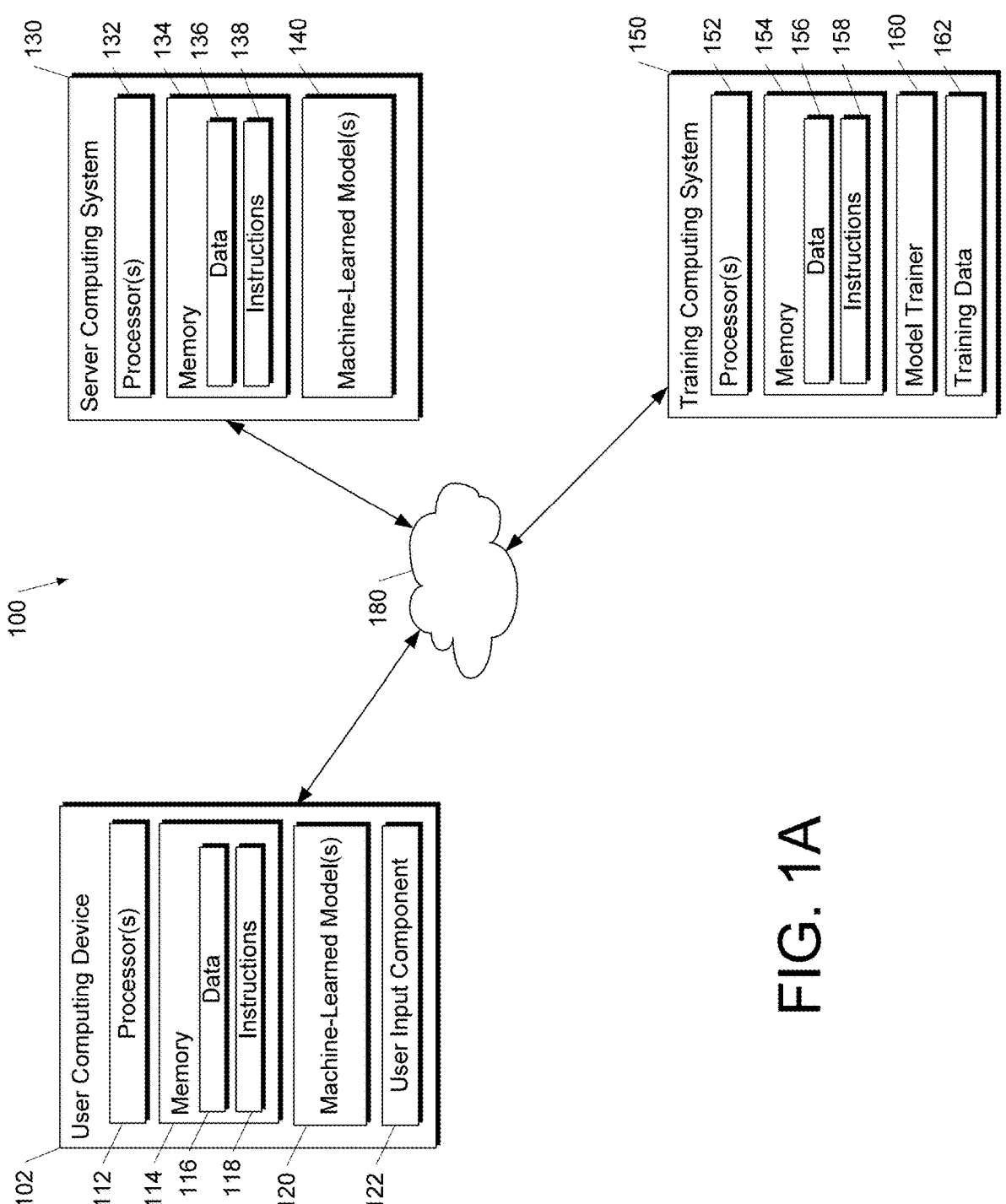
FIG. 1A depicts a block diagram of an example computing system that performs machine vision tasks according to example embodiments of the present disclosure.

Reference numerals that are repeated across plural figures are intended to identify the same features in various implementations.

DETAILED DESCRIPTION

Overview

Generally, the present disclosure is directed to various machine vision tasks performed by a visual transformer model (e.g., ViT) implemented by a neural network (NN). In particular, an enhanced neural network architecture of the embodiments includes a stem block and a transformer block.

In contrast to conventional visual transformers, the embodiments include one or more normalization layers in the stem block of the NN's architecture, which is prior to the transformer block of the NN's architecture. The stem block is primarily responsible for "preprocessing" (e.g., subdividing the input image into a set image patches) and embedding each image patch via a set of vector embeddings. The vector embeddings are passed to the transformer block. The transformer block is generally responsible for performing one or more machine visions tasks (e.g., image classification) via one or more self-attention sub-blocks and one or more multilayer perceptron (MLP) sub-blocks operating on the set of image patches.

The stem block includes a patch layer that performs the patching of an input image (e.g., subdividing the image into a set of image patches). The stem block includes an embedding layer that generates a vector embedding for each patch. In contrast to conventional architectures, the stem block also includes a first normalization layer between the patch layer and the embedding layer. The first patch layer normalizes each patch via a first normalization process. Normalizing a patch may include normalizing each channel of the patch (e.g., the red channel, the green channel, and the blue channel in RGB image encodings). Normalizing a channel of a patch may include normalizing the pixel values (e.g., the red-pixel values in the red channel, the green-pixel values in the green channel, and the blue-pixel values in the blue channel), such that the mean of the pixel values in each channel is 0.0 and the standard deviation of the pixel values in each channel is 1.0. In some embodiments, normalizing an image patch may additionally include applying a first linear transformation to each pixel value (or each channel) of the patch (after the pixels values have been normalized). A first set of parameters characterizing the first linear transformation may be learned via model training. The normalized patches are then fed to the embedding layer.

In further contrast to conventional architectures, the stem block includes a second normalization layer that normalized the vector embeddings of each patch, prior to the vector embeddings being fed to the transformer blocks. The normalization of a vector embedding for a image patch may include normalizing the components of the vector such that the mean of the vector components (for the vector embedding of the patch) is 0.0 and the standard deviation of the vector components (for the vector embedding of the patch) is 1.0. In some embodiments, normalizing a vector embedding may additionally include applying a second linear transformation to vector component value of the vector embedding (after the vector component values have been normalized). A second set of parameters characterizing the second linear transformation may be learned via model training. The normalized vector embeddings are then fed to the transformation block. Conventional architectures may not include either the first normalization layer and/or the second normalization layer in the stem block.

Aspects of the present disclosure provide a number of technical effects and benefits. For instance, at least due to the two normalization layers in the stem block, the vision transformer has significantly improved accuracy and performance in various machine vision tasks. Other technical effects and benefits include that a neural network system that includes one or more normalization layers can be trained more quickly than an otherwise identical neural network that does not include any normalization layers. For example, by including one or more normalization layers in the neural network system, problems caused by the distribution of a given layer's inputs changing during training can be mitigated. This may allow higher learning rates to be effectively used during training and may reduce the impact of how parameters are initialized on the training process. Additionally, during training, the normalization layers may act as a regularizer and may reduce the need for other regularization techniques, e.g., dropout, to be employed during training. Once trained, the neural network system that includes one normalization layers can generate neural network outputs that are as accurate, if not more accurate, than the neural network outputs generated by the otherwise identical neural network system.

With reference now to the Figures, example embodiments of the present disclosure will be discussed in further detail.

Example Devices and Systems

FIG. 1A depicts a block diagram of an example computing system 100 that performs machine vision tasks according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more models 120. For example, the models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models).

In some implementations, the one or more models 120 can be received from the server computing system 130 over network 180, stored in the user computing device memory 114, and then used or otherwise implemented by the one or more processors 112. In some implementations, the user computing device 102 can implement multiple parallel instances of a single model 120.

Additionally or alternatively, one or more models 140 can be included in or otherwise stored and implemented by the server computing system 130 that communicates with the user computing device 102 according to a client-server relationship. For example, the models 140 can be implemented by the server computing system 140 as a portion of a web service. Thus, one or more models 120 can be stored and implemented at the user computing device 102 and/or one or more models 140 can be stored and implemented at the server computing system 130.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models).

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the models 120 and/or 140 based on a set of training data 162. The training data 162 can include, for example, In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
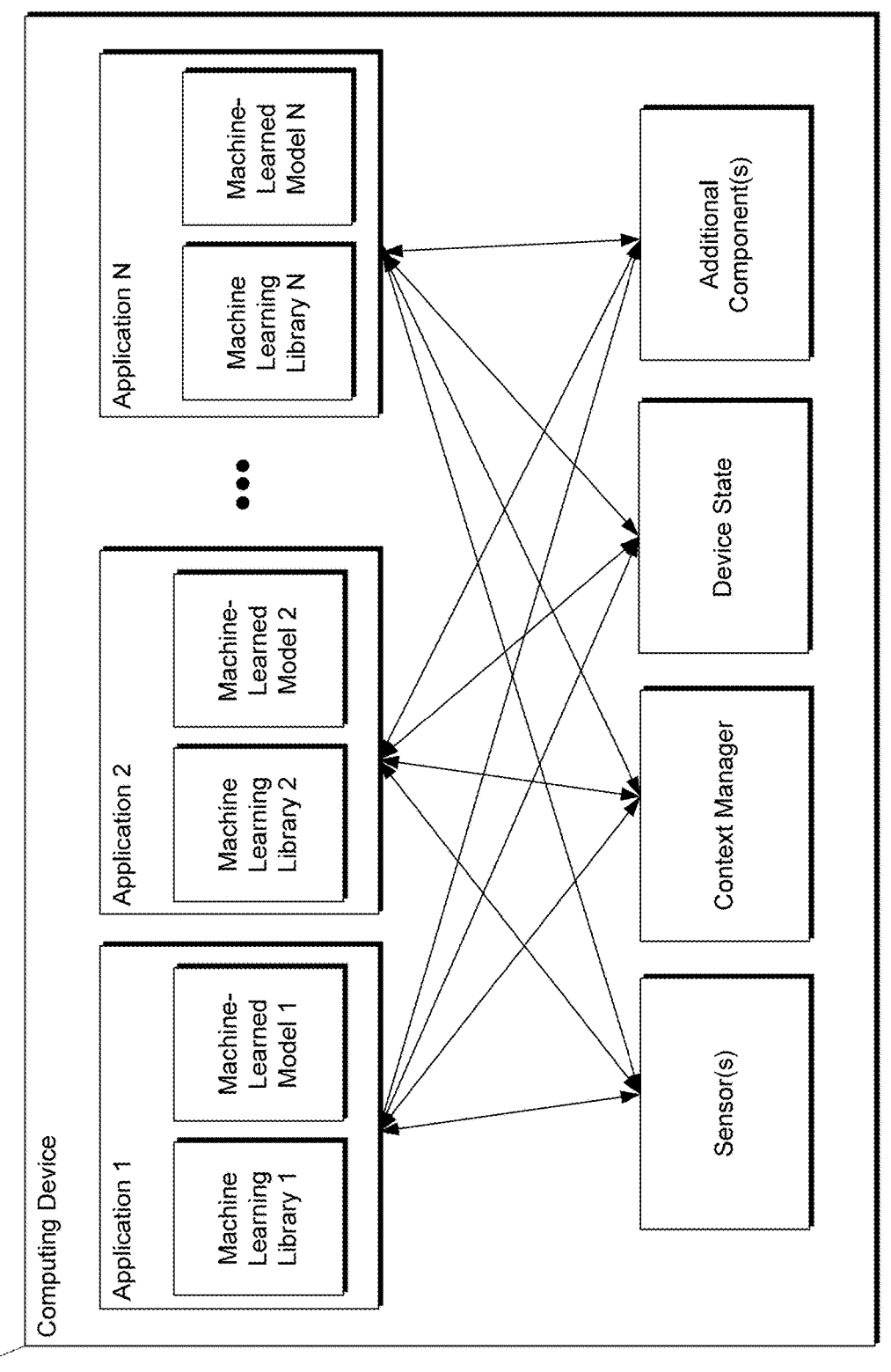
FIG. 1B depicts a block diagram of an example computing device that performs machine vision tasks according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
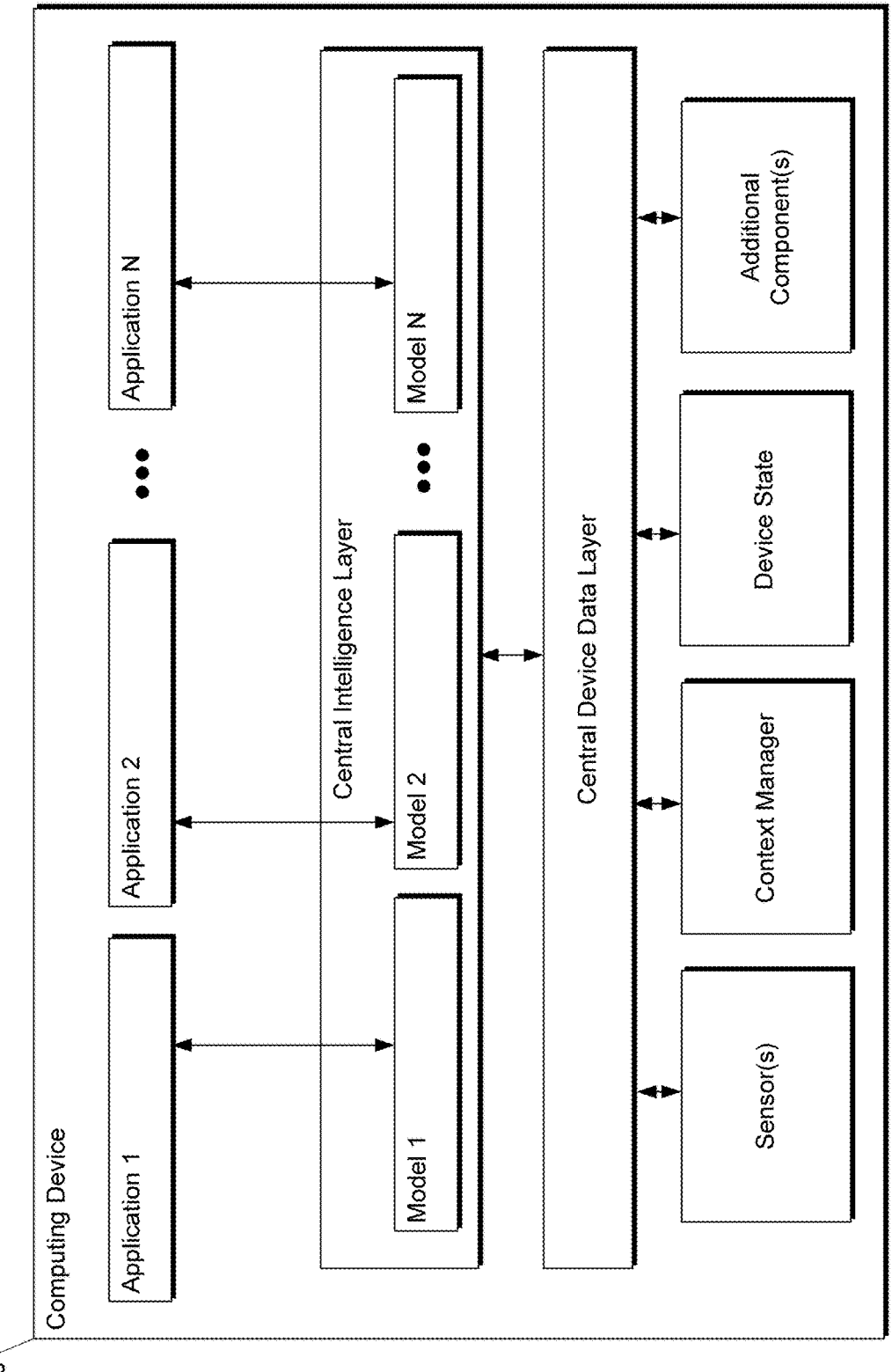
FIG. 1C depicts a block diagram of an example computing device that performs machine vision tasks according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

Figure 2:
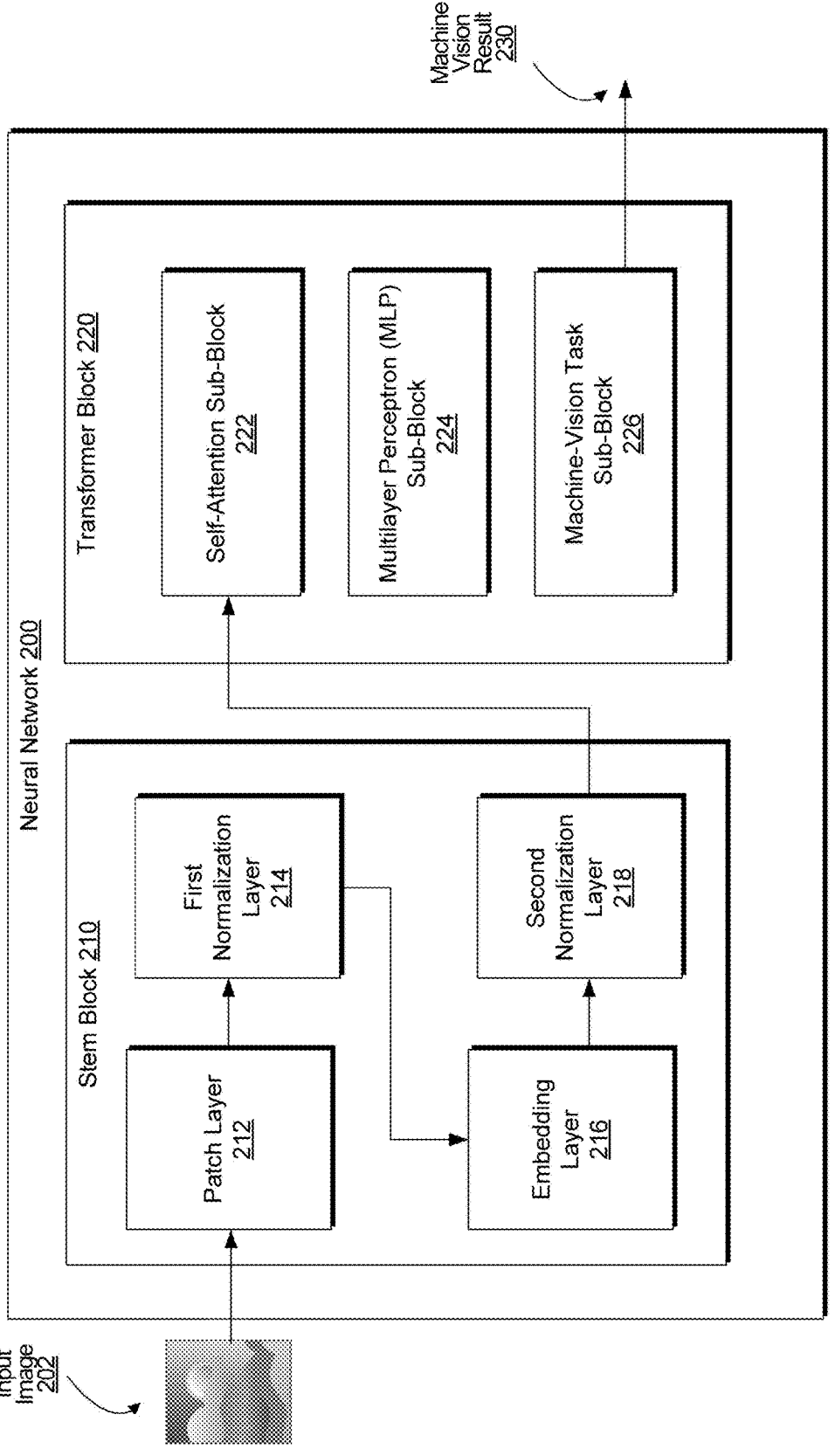
FIG. 2 depicts a neural network architecture for performing various machine vision tasks, according to example embodiments of the present disclosure.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).
Example Neural Network Architectures FIG. 2 depicts an architecture for a neural network 200 that performs various machine vision tasks, according to example embodiments of the present disclosure. The neural network 200 may include a stem block 210 that includes a set of stem layers. The neural network may additionally include a visual transformer block 220. The set of stem layers may include a patch layer 212, a first normalization layer 214, an embedding layer 216, and a second normalization layer 218. The patch layer 212 subdivides an input image 202 into a set of image patches. The first normalization layer 214 generates a set of normalized image patches by performing a first normalization process on each image patch of the set of image patches. The patch layer 212 feeds forward to the first normalization layer 214. The embedding layer 216 generates a set of vector embeddings. Each vector embedding of the set of embedding vectors is a projection of a corresponding normalized image patch from the set of normalized image patches onto a visual token. The first normalization layer 214 feeds forward to the embedding layer 216. The second normalization layer 218 generates a set of normalized vector embeddings by performing a second normalization process on each vector embedding of the set of vector embeddings. The embedding layer 216 feeds forward to the second normalization layer 218. The transformer block 220 enables one or more machine vision tasks for the input image based on the set of normalized vectors. The second normalization layer 218 feeds forward to the transformer block 220.

Figure 3:
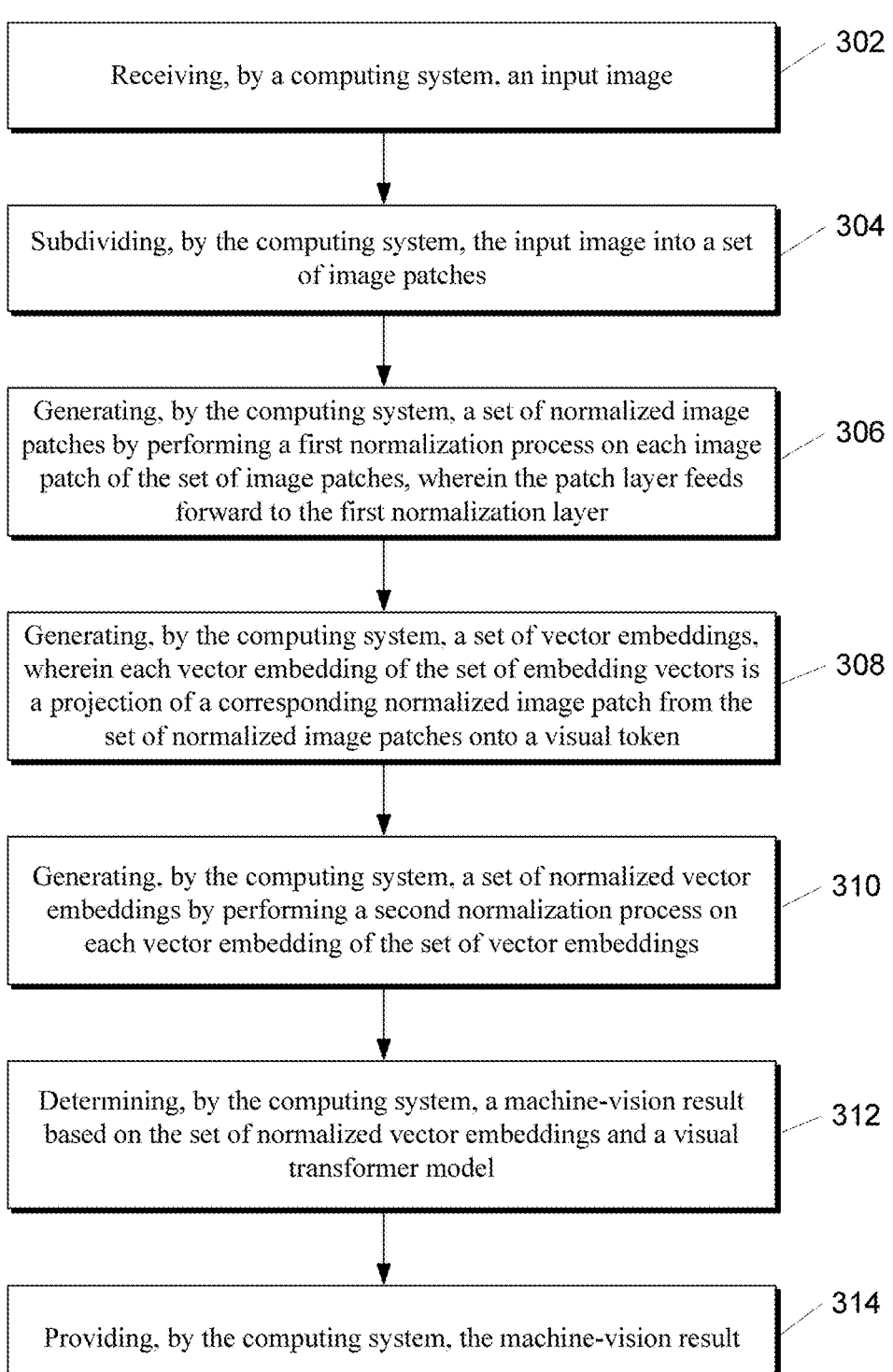
FIG. 3 depicts a flow chart diagram of an example method to perform a machine vision task according to example embodiments of the present disclosure.

The neural network 200 may additionally include a transformer block 220. The transformer block 220 may include a self-attention sub-block 222, a multilayer perceptron (MLP) sub-block 224, and a machine-vision task sub-block 226. The machine-vision task sub-block 226 may output a machine vision result 230 for the machine vision task (e.g., image classification).
Example Methods FIG. 3 depicts a flow chart diagram of an example method 300 to perform a machine vision task according to example embodiments of the present disclosure. Although FIG. 3 depicts steps performed in a particular order for purposes of illustration and discussion, the methods of the present disclosure are not limited to the particularly illustrated order or arrangement. The various steps of the method 300 can be omitted, rearranged, combined, and/or adapted in various ways without deviating from the scope of the present disclosure. Method 300 may be performed by a computing system. The computing system may implement a neural network (e.g., neural network 200 of FIG. 2). The neural network may implement at least some of the blocks of method 300.

At 302, a computing system may receive an input image (e.g., input image 202 of FIG. 2). At block 304, the computing system may subdivide the input image into a set of image patches. The patch layer 212 of FIG. 2 may perform block 304. At block 306, the computing system may generate a set of normalized image patches by performing a first normalization process on each image patch of the set of image patches. The first normalization layer 214 of FIG. 2 may perform block 306. At block 308, the computing system may generate a set of vector embeddings. Each vector embedding of the set of embedding vectors is a projection of a corresponding normalized image patch from the set of normalized image patches onto a visual token. The embedding layer 216 of FIG. 2 may perform block 308. At block 310, the computing system may generate a set of normalized vector embeddings by performing a second normalization process on each vector embedding of the set of vector embeddings. The second normalization layer 218 may perform block 310. At block 312, the computing system may determine a machine-vision result based on the set of normalized vector embeddings and a visual transformer model. The transformer block 220 of FIG. 2 may perform block 312. At block 314, the computing system may provide the machine-vision result.

Additional Disclosure

The embodiments include a vision transformer model. The vision transformer model may be employed in image classification applications, contrastive learning applications, semantic segmentation applications, and the like. The vision transformer model may be implemented by a neural network model (e.g., neural network 200 of FIG. 2). The neural network model may include a stem block (e.g., stem block 210 of FIG. 2) and a transformer block (e.g., transformer block 220 of FIG. 200. The stem block may include at least a patch layer (e.g., patch layer 212 of FIG. 2) and an embedding layer (e.g., embedding layer 216 of FIG. 2). In some embodiments, the stem block includes at least two normalization layers (e.g., first normalization layer 214 and second normalization layer 218 of FIG. 2.). The first normalization layer occurs before the patch embedding layer, while the second normalization layer occurs after the patch embedding layer. Such a dual normalization layers outperform other vision transformer models.

As noted above, the embodiments include the patch embedding layer (e.g., the patch layer 212 and/or embedding layer 216) (PE) followed by a stack of transformer blocks (e.g., self-attention sub-block 222, multilayer perceptron sub-block 224, and/or machine-vision task block 226 of FIG. 2). The PE layer first rearranges the image $x \in \mathcal{R}^{H \times W \times 3}$ into a sequence of patches $$x_p \in \mathcal{R}^{\frac{HW}{P^2} \times P^2}$$

where P denotes the patch size. It then projects each patch independently with a dense projection to constitute a sequence of "visual tokens"

$$x_t \in \mathcal{R}^{\frac{HW}{P^2} \times D} P$$

controls the trade-off between granularity of the visual tokens and the computational cost in the subsequent transformer layers.

As noted above, the embodiments employ multiple normalization layers, where the embedding layer is sandwiched between at least two normalization layers, e.g., see FIG. 2. Given a sequence of N patches $x \in \mathcal{R}^{N \times D}$, the normalization layers consist of two operations:

$$x = \frac{x - \mu(x)}{\sigma(x)} \qquad (1)$$

$$y = \gamma x + \beta \qquad (2)$$

where $\mu(x) \in \mathcal{R} N$, $\sigma(x) \in \mathcal{R}^N$, $\gamma \in \mathcal{R}^D$, $\beta \in \mathcal{R}^D$.

First, Eq. 1 normalizes each patch $x_i \in \mathcal{R}^D$ of the sequence to have zero mean and unit standard deviation. Then, Eq 2 applies learnable shifts and scales $\beta$ and $\gamma$ which are shared across all patches.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system comprising:

one or more processors; and one or more non-transitory computer-readable media that store instructions that when executed by the one or more processors, cause the computing system to implement a neural network comprising:

a stem block that includes a set of stem layers comprising:

a patch layer that subdivides an input image into a set of image patches;

a first normalization layer that generates a set of normalized image patches by performing a first normalization process on each image patch of the set of image patches, wherein the patch layer feeds forward to the first normalization layer;

an embedding layer that generates a set of vector embeddings, wherein each vector embedding of the set of vector embeddings is a projection of a corresponding normalized image patch from the set of normalized image patches onto a visual token and the first normalization layer feeds forward to the embedding layer; and a second normalization layer that generates a set of normalized vector embeddings by performing a second normalization process on each vector embedding of the set of vector embeddings, wherein the embedding layer feeds forward to the second normalization layer; and a transformer block that enables one or more machine-learned tasks for the input image based on the set of normalized vector embeddings, wherein the second normalization layer feeds forward to the transformer block.

2. The computing system of claim 1, wherein the transformer block comprises:

a self-attention sub-block;

a multilayer perceptron (MLP) sub-block; and a machine-vision task sub-block, wherein at least one of the one or more machine-learned tasks is one or more machine vision tasks.

3. The computing system of claim 2, wherein the one or more machine vision tasks includes an image classifier task and the machine-vision task sub-block implements an image classifier model.

4. The computing system of claim 1, wherein the transformer block implements a visual transformer model with one or more self-attention mechanisms.

5. The computing system of claim 1, wherein the first normalization process is performed for each channel of a set of channels of each image patch of the set of image patches.

6. The computing system of claim 5, wherein the set of channels includes a red channel, a green channel, and a blue channel.

7. The computing system of claim 1, wherein the first normalization process for a first image patch of the set of image patches comprises:

rescaling each pixel value of a first set of pixel values of the first image patch such that a mean value of the rescaled first set of pixel values is zero and a standard deviation of the rescaled first set of pixel values is one.

8. The computing system of claim 7, wherein the first normalization process for the first image patch further comprises:

transforming each pixel value of the rescaled first set of pixel values via a first linear transformation that is characterized by a first set of parameters.

9. The computing system of claim 8, wherein parameter values for the first set of parameters are determined while training the neural network.

10. The computing system of claim 8, wherein the second normalization process for a first vector embedding of the set of vector embeddings comprises:

rescaling each vector component of a first set of vector components of the first vector embedding such that a mean value of the rescaled first set of vector components is zero and a standard deviation of the rescaled first set of vector components is one.

11. The computing system of claim 10 wherein the second normalization process for the first vector embedding further comprises: transforming each vector component of the rescaled first set of vector components via a second linear transformation that is characterized by a second set of parameters.

12. The computing system of claim 11, wherein parameter values for the second set of parameters are determined while training the neural network.

13. A computer implemented method comprising:

receiving, by a computing system, an input image;

subdividing, by the computing system, the input image into a set of image patches;

generating, by the computing system, a set of normalized image patches by performing a first normalization process on each image patch of the set of image patches;

generating, by the computing system, a set of vector embeddings, wherein each vector embedding of the set of vector embeddings is a projection of a corresponding normalized image patch from the set of normalized image patches onto a visual token;

generating, by the computing system, a set of normalized vector embeddings by performing a second normalization process on each vector embedding of the set of vector embeddings;

determining, by the computing system, a machine-vision result based on the set of normalized vector embeddings and a visual transformer model; and providing, by the computing system, the machine-vision result.

14. The computer-implemented method of claim 13, wherein the computing system implements a neural network to implement at least a portion of the method.

15. The computer-implemented method of claim 14, wherein the neural network includes a stem block and a transformer block.

16. The computer-implemented method of claim 15, wherein a patch layer of the stem block subdivides the input image into the set of image patches.

17. The computer-implemented method of claim 16, wherein a first normalization layer performs the first normalization process.

18. The computer-implemented method of claim 17, wherein an embedding layer of the stem block generates the set of vector embeddings.

19. The computer-implemented method of claim 18, wherein a second normalization layer performs the second normalization process.

20. The computer-implemented method of claim 19, wherein the first normalization layer is positioned between the patch layer and the embedding layer, and wherein the second normalization layer is positioned between the embedding layer and the transformer block.

* * * * *